(12) United States Patent
Byrne et al.

(10) Patent No.: US 7,882,130 B2
(45) Date of Patent: Feb. 1, 2011

(54) METHOD AND APPARATUS FOR REQUESTOR SENSITIVE ROLE MEMBERSHIP LOOKUP

(75) Inventors: Robert L. Byrne, Voiron (FR); Jérôme Arnou, Echirolles (FR); Leszek K. Mencnarowski, Regensdorf (CH)

(73) Assignee: Oracle America, Inc., Redwood City, CA (US)

( * ) Notice: Subject to any disclaimer, the term of this patent is extended or adjusted under 35 U.S.C. 154(b) by 446 days.

(21) Appl. No.: 11/208,260

(22) Filed: Aug. 19, 2005

(65) Prior Publication Data

US 2006/0173869 A1     Aug. 3, 2006

(30) Foreign Application Priority Data

Feb. 3, 2005    (EP) ................... 05100757

(51) Int. Cl.
   *G06F 7/00*    (2006.01)
   *G06F 17/30*   (2006.01)
(52) U.S. Cl. ........................ 707/781; 707/791
(58) Field of Classification Search ........... 707/781, 707/785, 791, 694
   See application file for complete search history.

(56) References Cited

U.S. PATENT DOCUMENTS

| 6,347,312 B1* | 2/2002 | Byrne et al. ............... 707/3 |
| 6,748,374 B1* | 6/2004 | Madan et al. .............. 707/3 |
| 6,785,686 B2* | 8/2004 | Boreham et al. ........... 707/102 |
| 2003/0014394 A1 | 1/2003 | Fujiwara et al. |
| 2003/0105757 A1* | 6/2003 | Mangrola ...................... 707/9 |
| 2003/0115196 A1* | 6/2003 | Boreham et al. .............. 707/4 |
| 2003/0208478 A1* | 11/2003 | Harvey ......................... 707/3 |
| 2004/0078368 A1* | 4/2004 | Excoffier et al. .............. 707/4 |
| 2004/0083367 A1* | 4/2004 | Garg et al. .................. 713/170 |
| 2005/0004927 A1* | 1/2005 | Singer ........................ 707/100 |
| 2006/0117390 A1* | 6/2006 | Shrivastava et al. ........... 726/27 |

FOREIGN PATENT DOCUMENTS

JP     2002-312220     10/2002

OTHER PUBLICATIONS

M. Wahl Lightweight Directory Access Protocol, Dec. 1997, Network Working Group, pp. 1-50.*
European Search Report dated Jul. 4, 2005 (10 pages).
Patent Abstracts of Japan; Publication No. 2002-312220 dated Oct. 25, 2002 (2 pages).
Wahl, M. et al.; "Lightweight Directory Access Protocol"; IETF Standard, Internet Engineering Task Force, IETF, CH; Dec. 1997; pp. 1-51.

* cited by examiner

*Primary Examiner*—Luke S. Wassum
*Assistant Examiner*—Hexing Liu
(74) *Attorney, Agent, or Firm*—Osha•Liang LLP

(57) ABSTRACT

A directory server system that includes a data repository storing a plurality of entries, wherein the plurality of entries comprises a plurality of user entries and a plurality of role entries, wherein each of the plurality of role entries define a role and comprises an InterestedApplication attribute, a directory server executing a first operation to obtain initial results and execute a second operation to obtain final results, wherein the second operation uses the initial results and the InterestedApplication attribute to obtain the final results, and an application requesting the directory server to execute the first operation and the second operation.

6 Claims, 5 Drawing Sheets

METHOD AND APPARATUS FOR REQUESTOR SENSITIVE ROLE MEMBERSHIP LOOKUP

CROSS-REFERENCE TO RELATED APPLICATIONS

This application claims priority, under 35 U.S.C. §119, to European Patent Application No. 05100757.3 filed Feb. 3, 2005, entitled "METHOD AND APPARATUS FOR REQUESTOR SENSITIVE ROLE MEMBERSHIP LOOKUP."

BACKGROUND

A directory service is a collection of software, hardware, policies, and administrative procedures involved in making information stored in an associated directory accessible to entities requiring the information such as users, applications, etc. The directory service generally includes at least one instance of a directory server and one or more clients. The directory server may provide a centralized directory service for an intranet or extranet while integrating with existing systems.

More specifically, the directory server typically includes (or is operatively connected to) a general-purpose directory that stores all information in a single, network-accessible repository. The directory server provides a standard protocol and application programming interface (API) to access the information contained in the directory. Further, the directory server provides global directory services, meaning that information is provided to a wide variety of applications. As previously mentioned, the global directory service provides a single, centralized repository of directory information that any application can access. However, given the wide variety of entities (e.g., users, applications, etc.) that may access the directory, the directory requires a network-based means of uniformly communicating with the wide variety of entities. The directory may use a Lightweight Directory Access Protocol (LDAP) or some other database protocol (e.g. Directory Access Protocol, DMSL, etc.) to provide the aforementioned functionality.

LDAP is an on-the-wire bit protocol that runs over Transmission Control Protocol/Internet Protocol (TCP/IP). LDAP creates a standard way for entities (e.g., users, applications, etc.) to request and manage information stored in the directory. An LDAP-compliant directory leverages a single, master directory that owns all user, group, and access control information. The directory is hierarchical, not relational, and is optimized for reading, reliability, and scalability. This directory becomes the specialized, central repository that contains information about objects and provides user, group, and access control information to all entities (e.g., users, applications, etc.) on the network. For example, the directory can be used to provide information technology managers with a list of all the hardware and software assets in a widely spanning enterprise. Further, instead of creating an account for each user in each system the user needs to access, a single directory entry is created for the user in the LDAP directory. Client(s) can access names, phone numbers, addresses, and other data stored in the directory.

LDAP-compliant directory servers typically have nine basic protocol operations, which can be divided into three categories. The first category is query operations, which include search and compare operators. These query operations allow questions to be asked of the directory. The LDAP search operation is used to search the directory for entries and retrieve individual directory entries. The retrieval of entries from the directory (via the directory server) typically results in the entire entry being forwarded to the requesting client. The client may then subsequently perform additional operations of the retrieved entries to extract relevant information from the retrieved entries. Note that no separate LDAP read operation exists.

The second category is update operations, which include add, delete, modify, and modify distinguished name (DN), i.e., rename, operators. A DN is a unique, unambiguous name of an entry in LDAP. These update operations allow the update of information in the directory. The third category is authentication and control operations, which include bind, unbind, and abandon operations. The bind operation allows a client to identify itself to the directory by providing an identity and authentication credentials. The DN and a set of credentials are sent by the client to the directory. The server checks whether the credentials are correct for the given DN and, if the credentials are correct, notes that the client is authenticated as long as the connection remains open or until the client re-authenticates. The unbind operation allows a client to terminate a session. When the client issues an unbind operation, the server discards any authentication information associated with the client connection, terminates any outstanding LDAP operations, and disconnects from the client, thus closing the TCP connection. The abandon operation allows a client to indicate that the result of an operation previously submitted is no longer of interest. Upon receiving an abandon request, the server terminates processing of the operation that corresponds to the message ID.

In addition to the three main groups of operations, the LDAP protocol defines a framework for adding new operations to the protocol via LDAP extended operations. Extended operations allow the protocol to be extended in an orderly manner to meet new marketplace needs as they emerge.

SUMMARY

In general, in one aspect, the invention relates to a directory server system, comprising a data repository storing a plurality of entries, wherein the plurality of entries comprises a plurality of user entries and a plurality of role entries, wherein each of the plurality of role entries define a role and comprises an InterestedApplication attribute, a directory server executing a first operation to obtain initial results and execute a second operation to obtain final results, wherein the second operation uses the initial results and the InterestedApplication attribute to obtain the final results, and an application requesting the directory server to execute the first operation and the second operation.

In general, in one aspect, the invention relates to a directory server system, comprising a data repository comprising a plurality of user entries and a plurality of role definitions associated with a plurality of roles, wherein each of the plurality of user entries is associated with a plurality of roles and wherein each of the plurality of role definitions comprises an InterestedApplication attribute listing at least one associated application, a directory server configured to execute a first operation to obtain initial results and apply a control to obtain final results, wherein the control uses the initial results and the InterestedApplication attribute of the at least one of the plurality of roles to obtain the final results, and an application configured to request the directory server to execute the first operation and the control.

In general, in one aspect, the invention relates to a computer system to manage a directory server wherein the directory server system comprises a plurality of user entries and a plurality of role definitions associated with a plurality of roles, wherein each of the plurality of user entries is associated with a plurality of roles and wherein each of the plurality of role definitions comprises an InterestedApplication attribute listing at least one associated application, comprising a processor, a memory, and software instructions stored in the memory for enabling the computer system under control of the processor, to perform execute a first operation to obtain initial results, and execute a second operation to obtain final results, wherein the second operation uses the initial results and the InterestedApplication attribute to obtain the final results, wherein the initial results comprises the plurality of user entries that match the search criteria and the plurality of roles associated with the plurality of user entries that match the search criteria, wherein the final results comprise a subset of the plurality of roles associated with each of the plurality of user entries that match the search criteria, wherein the subset of the plurality of roles is determined by querying the InterestedApplication attribute for each of the plurality of roles to obtain an interested role list, and discarding any of the plurality of roles that are not in the interested role list to obtain the subset of the plurality of roles.

In general, in one aspect, the invention relates to a method of processing a Lightweight Directory Access Protocol request from a client computer using a directory server comprising receiving a request to execute a first operation and a control from an application, executing the first operation to obtain initial results, wherein the initial results comprise a plurality of user entries that match a search criteria and a plurality of roles associated with the plurality of user entries that match the search criteria, executing the control to obtain final results, wherein the second operation uses the initial results and an InterestedApplication attribute to obtain the final results, wherein the final results comprise a subset of the plurality of roles associated with each of the plurality of user entries that match the search criteria, wherein the subset of the plurality of roles is determined by applying the control to the initial results, wherein the control comprises functionality to query the InterestedApplication attribute for each of the plurality of roles to obtain an interested role list wherein each of the plurality of roles listed on the interest role list are associated with the application, and discard any of the plurality of roles that are not in the interested role list to obtain the subset of the plurality of roles.

In general, in one aspect, the invention relates to a plurality of nodes, comprising a data repository storing a plurality of entries, wherein the plurality of entries comprises a plurality of user entries and a plurality of role entries, wherein each of the plurality of role entries define a role and comprises an InterestedApplication attribute, a directory server executing a first operation to obtain initial results and execute a second operation to obtain final results, wherein the second operation uses the initial results and the InterestedApplication attribute to obtain the final results, and an application requesting the directory server to execute the first operation and the second operation, wherein the data repository is located on at least one of the plurality of nodes, wherein the directory server is executing on at least one of the plurality of nodes, wherein the application is executing on at least one of the plurality of nodes, and wherein at least one of the plurality of role entries is a filtered role.

In general, in one aspect, the invention relates to a directory server system, comprising a data repository storing a plurality of entries, wherein the plurality of entries comprises a plurality of user entries, a plurality of role entries, and at least one application entry, wherein each the at least one application entry comprises an InterestedRole attribute, a directory server executing a first operation to obtain initial results and execute a second operation to obtain final results, wherein the second operation uses the initial results and the InterestedRole attribute to obtain the final results, and an application requesting the directory server to execute the first operation and the second operation, wherein at least one of the plurality of role entries is a filtered role.

Other aspects of the invention will be apparent from the following description and the appended claims.

DETAILED DESCRIPTION

Figure 1:
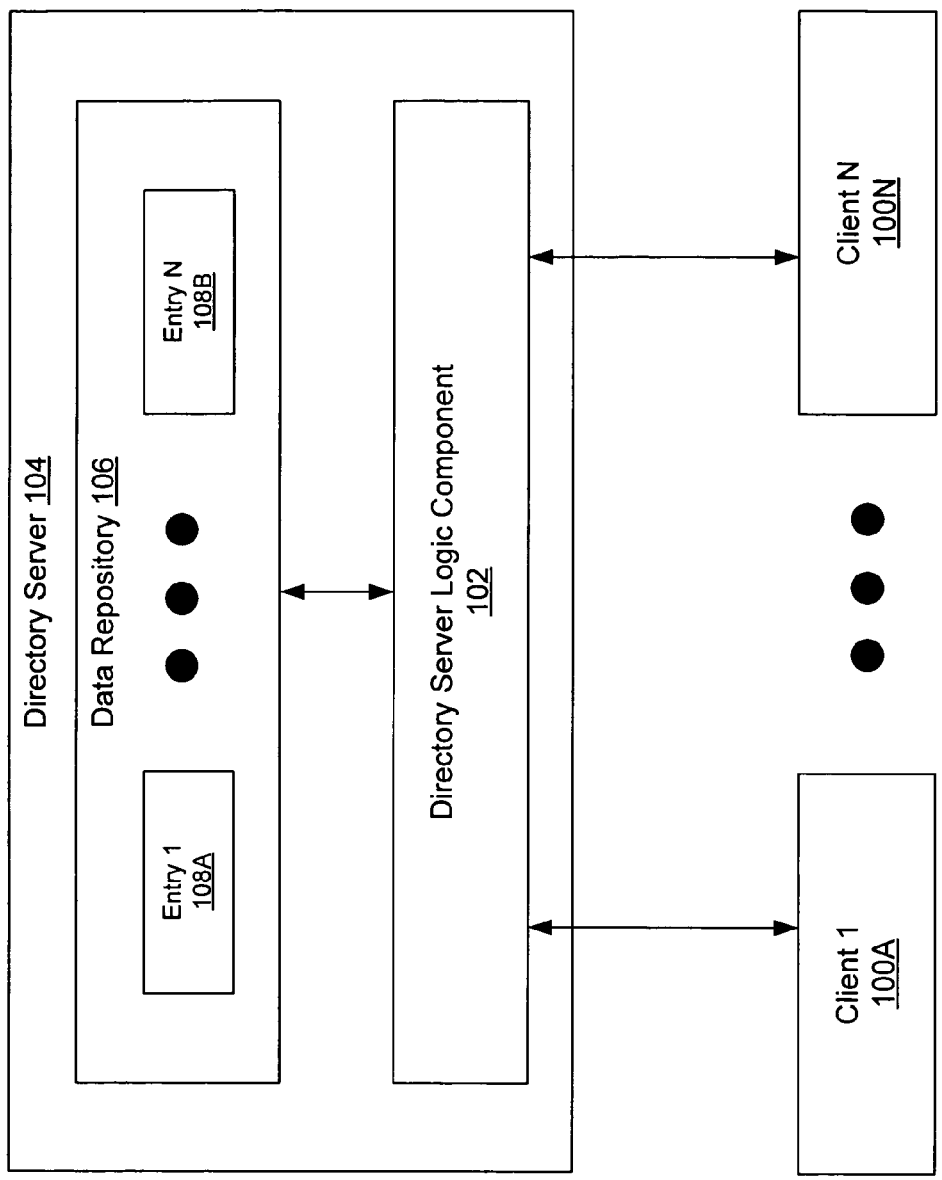
FIG. 1 shows a system in accordance with one embodiment of the invention.

Specific embodiments of the invention will now be described in detail with reference to the accompanying figures. Like elements in the various figures are denoted by like reference numerals for consistency.

In general, embodiments of the invention relate to a method and system for performing a role-sensitive lookup. More specifically, embodiments of the invention provide a method and system for associating an application with one or more roles in the system. Further, embodiments of the invention use the association between the application and one or more roles to decrease the amount of data communicated between the application and a directory storing one or more entries. In addition, embodiments of the invention also decrease the computational cost of query/search operations and the number of query operations.

FIG. 1 shows a system in accordance with one embodiment of the invention. The system includes a directory server (104) operatively connected to one or more clients (e.g., client 1 (100A), client N (100N)). In one embodiment of the invention, the directory server (104) includes a directory server logic component (102) and a data repository (106). The directory server logic component (102) provides an interface between the clients (e.g., client 1 (100A), client N (100N)) and the data repository (106). Further, the directory server logic component (102) includes functionality to receive requests to perform operations on data stored in the data repository (106), to perform the operations on the data stored in the data repository (106), and to return results (obtained from performing the operation) to the clients (e.g., client 1 (100A), client N (100N)). In one embodiment of the invention, the directory server logic component (102) includes functionality to receive LDAP requests, process LDAP requests, and return the results obtained from processing the LDAP requests to the requesting clients (e.g., client 1 (100A), client N (100N)). Those skilled in the art will appreciate that other database protocol besides LDAP may also be used send, receive, and process requests.

Figure 2:
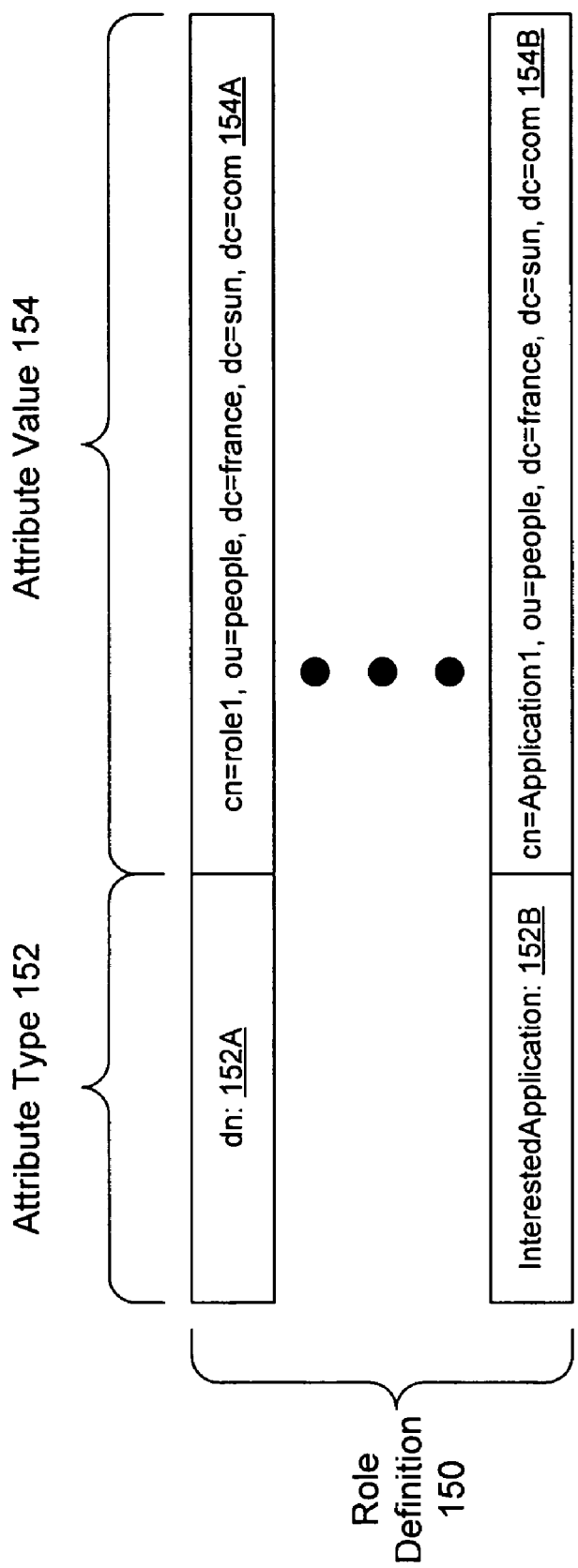
FIG. 2 shows a role definition in accordance with one embodiment of the invention.

In one embodiment of the invention, a data repository (106) is a storage system (e.g., a relational database stored on a storage medium, a hierarchical file system stored across a disk array, etc.), which includes one or more entries (e.g., entry 1 (108A), entry N (108N)). In one embodiment of the invention, the entries may correspond to users, applications, roles, etc. Each entry is identified by a distinguished name (DN) and includes one or more attribute type-attribute value pairs. An example of an entry is shown in FIG. 2. Further, in one embodiment of the invention, the data repository (106) is LDAP compliant (i.e., the data repository accepts requests using LDAP). Those skilled in the art will appreciate that while FIG. 1 shows a data repository (106) located in the directory server (104), the data repository (106) may be located outside the directory server (104) and communicate with the directory server (106) using any type of communications protocol (e.g., TCP/IP, HTTP, etc.).

In one embodiment of the invention, the clients (e.g., client 1 (100A), client N (100N)) represent one or more applications (not shown). Further, each of the applications may include functionality to request the directory server (104) to provide a list of entries that match a particular search criteria. In addition, the application may include functionality to only request portions of an entry that are of interest to the application. For example, the application may include functionality to request the directory server to return only portions of an entry associated with a particular role (e.g., a role associated with the application) to the application.

Further, in one embodiment of the invention, the directory server logic component (102) includes functionality to receive a request to return only portions of an entry associated with a particular role (e.g., a role associated with the application) to the application and process such as request. An embodiment for processing such as a request is shown in FIG. 3.

As noted above, embodiments of the invention provide a method and system for receiving and processing a request to return only portions of an entry associated with a particular role (e.g., a role associated with the application) to the application. The following discussion describes a role in accordance with one embodiment of the invention. In one embodiment of the invention, a role corresponds to a grouping of privileges. For example, a role denoted by the identifier "admin" may include privileges to read an entry, modify an entry, write a new entry, etc. Thus, when a user is associated with the role "admin," the user has all of the aforementioned privileges. In addition, in one embodiment of the invention, the role may also include information corresponding to one or more applications associated with the role. Further, in one embodiment of the invention, a given user entry (not shown) may be associated with more than one role.

FIG. 2 shows a role definition in accordance with one embodiment of the invention. As shown in FIG. 2, the role definition (150) includes a number of attribute type (152-attribute value (154) pairs. The attribute type (152) and corresponding attribute value (154) in the role definition (150) typically depend, at least in part, on the protocol (e.g., LDAP) used to access the role definition (150). In the role definition shown in FIG. 2, the role definition (150) has a dn: (152A) attribute (i.e., a distinguished name attribute) with a corresponding attribute value: cn=role1, ou=people, dc=france, dc=sun, dc=com (154A). Further, the role definition shown in FIG. 2 includes an InterestedApplication (152B) attribute with a corresponding attribute value: cn=application 1, ou=people, dc=france, dc=sun, dc=com (154A). In one embodiment of the invention, the InterestedApplication (152B) attribute includes one or more applications (identified, for example, by the attribute type of common name (cn), organizational unit (ou), and one or more domain components (dc)) which use the corresponding role to perform one or more functions including, but not limited to, access management, resource provisioning, access control, etc. Though not shown in FIG. 2, the role definition (150) may include additional attribute type (152)-attribute value (154) pairs.

Figure 3:
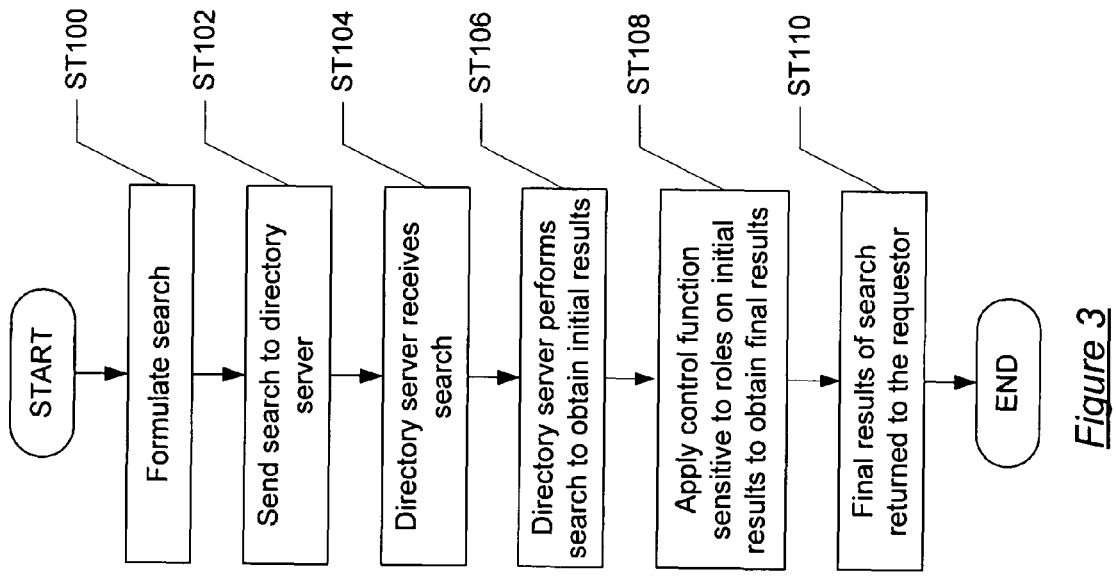
FIG. 3 shows a flowchart in accordance with one embodiment of the invention.

FIG. 3 shows a method in accordance with one embodiment of the invention. Specifically, the embodiment shown in FIG. 3 describes a method for performing a role sensitive search in accordance with one embodiment of the invention. Initially, an application (executing on a client operatively connected to the directory server) formulates a search (ST100). In one embodiment of the invention, formulating the search includes specifying a search criteria (e.g., criteria used to select one or more entries in the directory operatively connected to the directory server). In addition, formulating the search may also include specifying a control which includes functionality to limit the results of the search based on an InterestedApplication attribute (described above) in the role definition. In one embodiment of the invention, a control is defined in RFC 2251 (www.rfc.net/rfc2251.html) and provides a mechanism to specify extended functionality to LDAP. In particular, the control may be used to define additional operations which are to be performed by the directory server prior to returning results back to the requesting application (via the client).

Once the search has been formulated, the search is forwarded to the directory server (ST102). The directory server (typically the directory server logic component) receives the search (ST104). The directory server (typically the directory server logic component) subsequently performs a search to obtain initial results (ST106). In one embodiment of the invention, the initial results correspond to the results that match the search criteria (as defined during the formulation of the search (ST100)). In one embodiment of the invention, the initial results correspond to entire entry including, but not limited to, multiple roles associated with the each of the entries.

The control (specified during the formulation of the search) is subsequently applied to the initial results to obtain final results (ST108). In one embodiment of the invention, applying controls to the initial results includes querying each of the InterestedApplication roles defined in the directory and determining which roles are associated with the application that requested the search. The result of the aforementioned querying is an interested role list. The roles listed in each of the entries in the initial results are subsequently compared with the list of interested roles. Any role in an entry in the initial results that is not on the interested role list is removed from the initial search results. Thus, the only roles included in the final results are the roles in which the application is interested. By removing the roles in which the application is not interested, the amount of data transferred between the directory server and the client is reduced. In addition, the application does not need to perform an additional search on the client to determine which roles the application is interested in, thereby reducing the computations and code required on the client. The final results are subsequently returned to the application (via the client) (ST110).

Those skilled in the art will appreciate that while the invention was described using LDAP controls, the invention may be implemented using a modified version of LDAP that supports the aforementioned functionality in, for example, the standard search operation. Further, those skilled in the art will appreciate that some implementations that already include directory servers implementing LDAP may use a control (as described above), as opposed to a modified version of LDAP, to support backwards compatibility.

Figure 4:
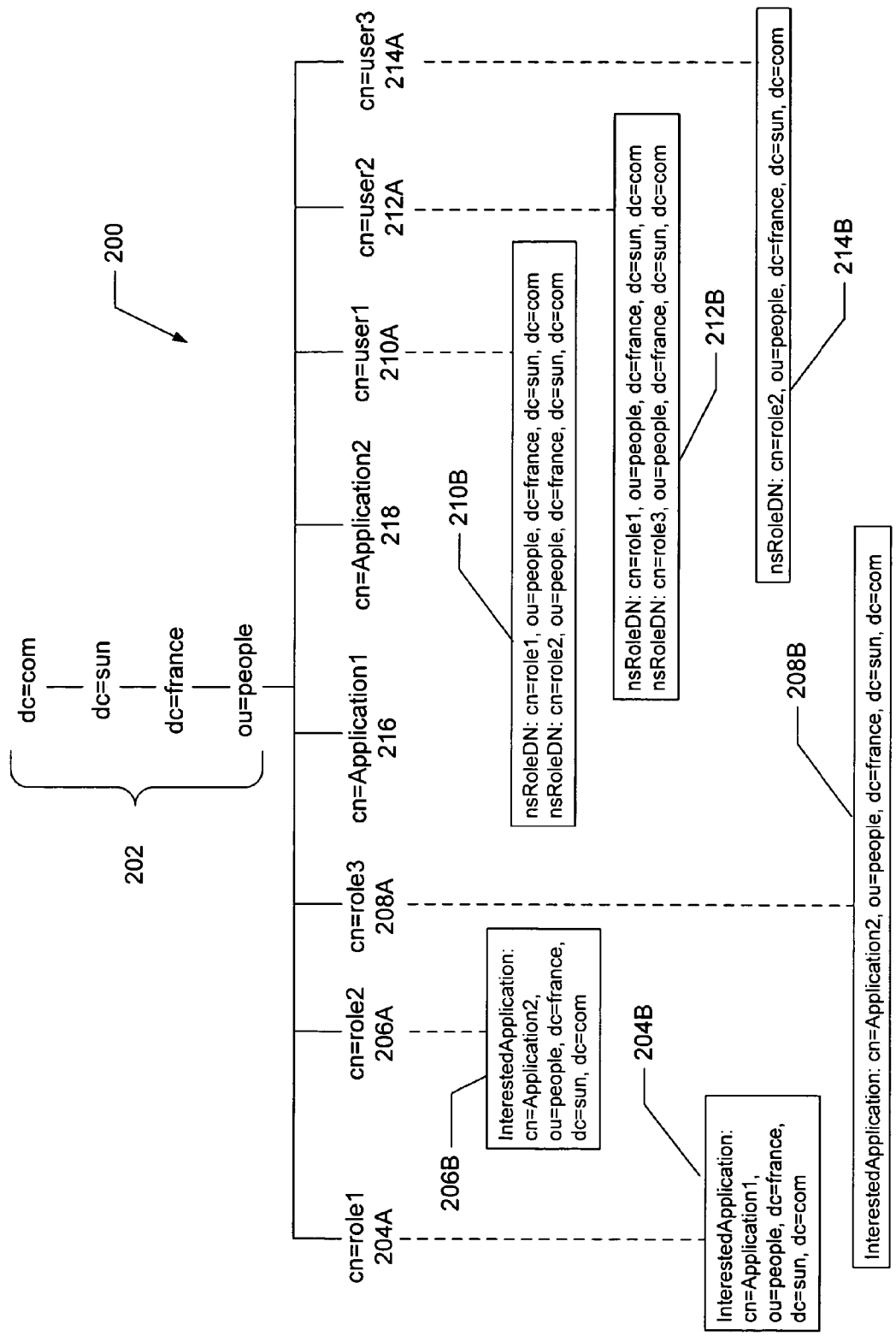
FIG. 4 shows an example in accordance with one embodiment of the invention.

FIG. 4 shows an example of an implementation of one embodiment of the invention. FIG. 4 shows a number of associated directory entries (200) in data repository accordance with one embodiment of the invention. The entries include a series of domain components and an organizational unit (202) (i.e., dc=com, dc=sun, dc=france, ou=people). The domain components and the organization unit (202) are operatively connected to a number of additional entries. These entries include cn=role1 (204A), cn=role2 (206A), cn=role3 (208A), cn=Application1 (216), cn=Application2 (218), cn=user1 (210A), cn=user2 (212A), and cn=user3 (214A). The cn=role1 (204A), the cn=role2 (206A), and the cn=role3 (208A) correspond to role entries, the cn=Application1 (216) and the cn=Application2 (218) correspond to application entries, and the cn=user1 (210A), the cn=user2 (212A), and the cn=user3 (214A) correspond to user entries.

One skilled in the art will appreciate that portions of the aforementioned entries shown in FIG. 4 only correspond to portions related to embodiments of the invention described above. However, those skilled in the art will appreciate that additional attribute type-attribute value pairs, which are not shown may also be included in the entries. The cn=role1 (204A) entry includes the following portion of the entry: InterestedApplication: cn=Application1, ou=people, dc=france, dc=sun, dc=com (204B). The cn=role2 (206A) entry includes the following portion of the entry: InterestedApplication: cn=Application2, ou=people, dc=france, dc=sun, dc=com (206B). The cn=role3 (208A) entry includes the following portion of the entry: InterestedApplication: cn=Application2, ou=people, dc=france, dc=sun, dc=com (208B).

Thus, application 1 (denoted by the entry cn=Application1 (216)) is associated with role 1. Similarly, application 2 (denoted by the entry cn=Application2 (218)) is associated with role 2 (denoted by cn=role2 (206A)) and role 3 (denoted by the entry cn=role3 (208A)). Further, user 1 (denoted by the entry cn=user 1 (210A)) is associated with roles 1 and 2 as shown in the portion of the user 1 entry (210B). Similarly, user 2 (denoted by the entry cn=user2 (212A)) is associated with roles 1 and 3 as shown in the portion of the user 1 entry (212B). Further, user 3 (denoted by the entry cn=user3 (214A)) is associated with role 2 as shown in the portion of the user 3 entry (214B).

Using the aforementioned directory entries (i.e., the directory entries shown in FIG. 4), consider a search formulated by application 1 which includes search criteria and a control in accordance with one embodiment of the invention. Further, assume that the search criteria resulted in user 1 and user 2 (defined above) satisfying the search criteria. Thus, the initial result would include the portions of the user 1 entry (210B) and the user 2 entry (212B) which include multiple roles. At this stage, the initial result has not been communicated to application 1. The control, specified in the search formulated by application 1, subsequently triggers the directory server to query the roles (i.e., role 1, role 2, role 3) listed in the directory (200) and determine which roles are associated with application 1. In this particular example, only role 1 is associated with application 1 (as indicated by the InterestedApplication attribute in the role 1 entry). Thus, role 1 is placed on an interested application list (or alternatively, maintained in memory associated with the directory server while the directory server is applying the control to the initial result). After applying the control the initial result, the roles associated with the users that are not on the interested role list (i.e., role 2 for user 1 and role 3 for user 2) are removed from the initial result. Thus, the final result includes the user entries (i.e., user 1 entry and user 2 entry) and only the roles (i.e., role 1) with which the application is associated. The final result is communicated to application 1.

In one embodiment of the invention, instead of including the InterestedApplication attributed in the role entry, the InterestedRole attribute may be included in the Application entry. If the InterestedRole Attribute is located in the Application entry, then the InterestedRole attribute includes one or more roles associated with the Application. In this embodiment, when request for a particular role associated with a user is requested by an application, the directory server logic component (102) first obtains the list of roles associated with the application. The directory server logic component (102) then proceeds to apply the search criteria to obtain an initial result (i.e., a list of entries which match the search criteria).

The directory server logic component (102) subsequently compares the role attributes within each of the entries listed in the initial result with the roles associated with the requesting application. For each entry, if the role in the entry matches the one or more roles associated with the requesting application, then the entry is included in the final results. Once all entries in the initial result have been processed, the final result is forwarded to the requesting application (via the client executing the application).

In another embodiment of the invention, the control may include an explicit list of roles which are associated with the application. Thus, when an application requests one or more entries, the request would include search criteria as well as a control which includes the list of roles associated with the application. The directory server logic component (102), upon receiving such a request, obtains an initial result using the search criteria and then obtains the final result by comparing the roles associated with the entries in the initial result with the roles listed in the control. For each entry, if the role in the entry matches the one or more roles associated with the requesting application, then the entry is included in the final results. Once all entries in the initial result have been processed, the final result is forwarded to the requesting application (via the client executing the application).

Those skilled in the art will appreciate that the aforementioned invention may be used with managed roles, filtered roles, and nested roles. Managed roles correspond to roles which are explicitly associated with an entry (i.e., user entry 1 is associated with role 1). Filtered roles (also known as dynamic roles) are roles which are determined using a specified LDAP filter. In this way, whether a particular user entry is associated with a given role depends on the attributes listed within the entry. Finally, nested roles correspond to roles which include other roles. Those skilled in the art will appreciate that other types of roles may also be used with embodiments of the invention.

In one embodiment of the invention, if the directory server is using filtered roles, then by using the InterestedRole attribute, the directory server logic component (102) will only have to apply the specified LDAP filter associated with the roles listed in the InterestedRole attribute list to the entries in the initial result. Thus, embodiments of the invention decrease the amount of computation and/or processing time required to determine the final result of the search operation. More specifically, if the entries in the directory server are associated with a large number of filter roles and the requesting application is only interested in a subset of these filtered roles, then the use of the InterestedRole attribute will decrease the number of executions of the specified LDAP filter.

Figure 5:
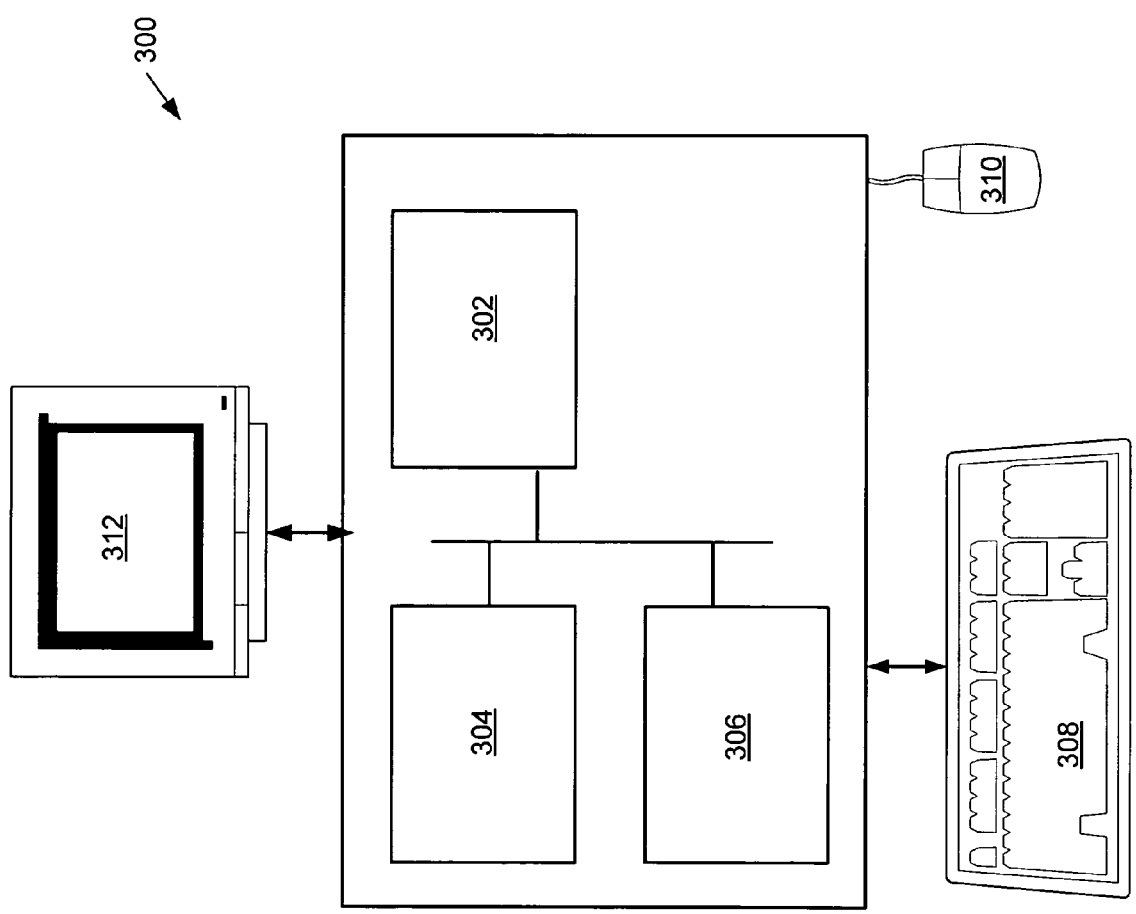
FIG. 5 shows a computer system in accordance with one embodiment of the invention.

The invention may be implemented on virtually any type of computer regardless of the platform being used. For example, as shown in FIG. 5, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., the client(s), the directory server, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A directory server system, comprising:
    a processor; and
    a data repository, comprising:
        a data repository comprising a plurality of user entries and a plurality of role definitions defining a plurality of roles, wherein each of the plurality of user entries is associated with at least one of the plurality of roles, and wherein each one of the plurality of role definitions comprises an InterestedApplication attribute specifying at least one application associated with one of the plurality of roles; and
    a memory comprising software instructions executable by the processor for a directory server configured to execute a search operation, in response to a request from a requesting application, using search criteria to obtain initial results and subsequently apply an application filter to obtain final results,
        wherein the application filter is configured to use the initial results and the InterestedApplication attribute of at least one of the plurality of role definitions to obtain the final results,
        wherein the initial results comprise a plurality of user entries that match the search criteria and a plurality of roles corresponding to the plurality of user entries that match the search criteria, and
        wherein the application filter comprises functionality to:
            query the plurality of role definitions to obtain an interested role list comprising at least one role of the plurality of roles, wherein the InterestedApplication attribute of each role in the interested role list matches the requesting application, and
            identify at least one user entry of the plurality of user entries included in the initial results, wherein the at least one user entry corresponds to at least one of the plurality of roles included in the initial results, wherein the at least one of the plurality of roles included in the initial results matches the at least one role included in the interested role list, wherein the final result comprises the identified at least one user entry,
        wherein the requesting application is configured to use the final result to determine users allowed to access the requesting application.

2. The directory server system of claim 1, wherein at least one of the plurality of roles is a filtered role.

3. The method of claim 1, wherein the at least one application is associated with the one of the plurality of defined roles when the at least one application uses the one of the plurality of roles for at least one selected from the group consisting of access management, resource provisioning, and access control.

4. A method of processing a Lightweight Directory Access Protocol request from a client computer using a directory server comprising:
    receiving a request to execute a search operation and an application filter from a requesting application;
    executing the search operation to obtain initial results, wherein the initial results comprise a plurality of user entries that match a search criteria and a plurality of roles associated with the plurality of user entries that match the search criteria;
    executing the application filter to obtain final results, wherein executing the application filter comprises:
        querying a plurality of roles stored in a data repository to obtain an interested role list, wherein each role included in the interested role list comprises an InterestedApplication attribute specifying that the role is associated with the requesting application, and
        obtaining the final results by identifying at least one user entry of the plurality of user entries in the initial results, wherein the at least one user entry is associated with at least one role of the plurality of roles in the initial results, wherein the at least one role matches at least one role included in the interested role list, and wherein the final results comprise a subset of the initial results; and
    determining users allowed to access the requesting application using the final results.

5. The method of claim 4, wherein the requesting application is associated with the role when the requesting application uses the role for at least one selected from the group consisting of access management, resource provisioning, and access control.

6. The method of claim 4, wherein at least one of the plurality of roles is a filtered role.

* * * * *